No. 879,096. PATENTED FEB. 11, 1908.
J. GAUNT.
PERCOLATOR.
APPLICATION FILED JAN. 7, 1907.
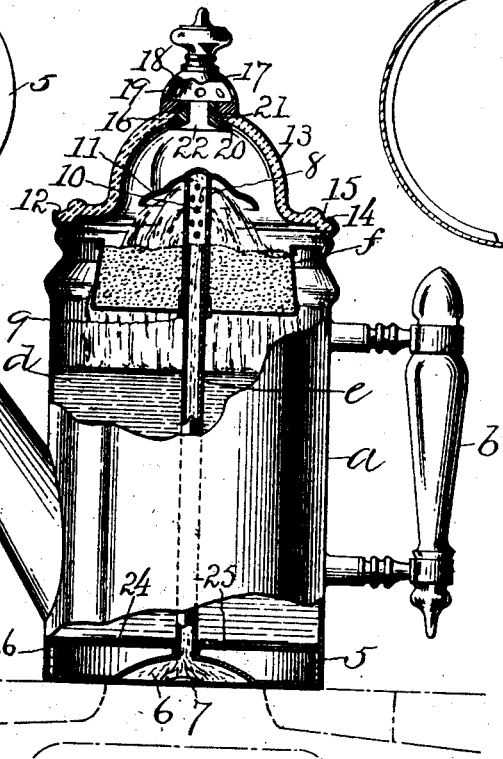
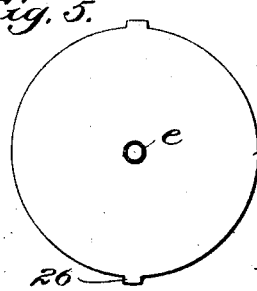
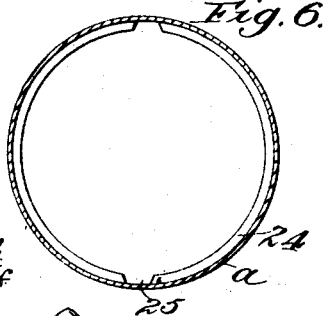
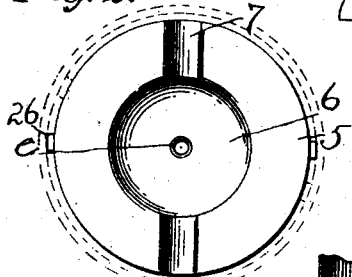
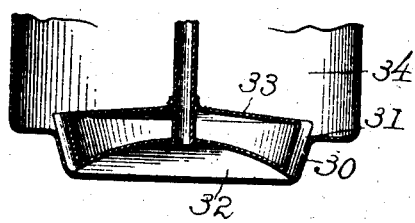
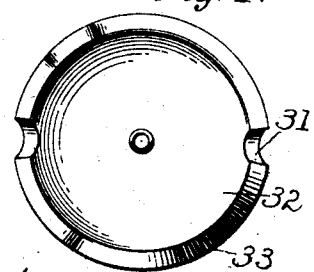
WITNESSES:
L. E. Berkovitch.
M. L. Hawkins.
INVENTOR.
John Gaunt.
BY
Arthur B. Jenkins
ATTORNEY.

UNITED STATES PATENT OFFICE.

JOHN GAUNT, OF MERIDEN, CONNECTICUT, ASSIGNOR OF ONE-HALF TO WILLIAM M. PRISK, OF YALESVILLE, CONNECTICUT.

PERCOLATOR.

No. 879,096.   Specification of Letters Patent.   Patented Feb. 11, 1908.

Application filed January 7, 1907. Serial No. 351,073.

*To all whom it may concern:*

Be it known that I, JOHN GAUNT, a citizen of the United States, and a resident of Meriden, in the county of New Haven and State of Connecticut, have invented a new and Improved Percolator, of which the following is a specification.

My invention relates to the class of devices for preparing coffee or the like for drinking purposes, and the object of my invention is to provide a device of this class in which a minimum amount of heat shall be required in the operation of the device; and a further object of the invention is to provide means for maintaining the liquid at the proper temperature to produce the best results; and a further object of the invention is to provide means for relieving the pressure from within the receptacle; and a further object is to provide means for maintaining the handle of the cover at a temperature which will allow it to be readily grasped by the hand. A form of device in the use of which these objects may be attained is illustrated in the accompanying drawings, in which—

Figure 1 is a view partially in central section of a device embodying my invention. Fig. 2 is a bottom view of the insulating shell, the dotted lines representing the outer and inner walls of the pot. Fig. 3 is a view of the lower portion of a pot showing the application of the invention to a structure of a different form from that shown in Fig. 1. Fig. 4 is a bottom view of the insulating shell used with the form of pot shown in Fig. 3. Figs. 5 and 6 are detail views showing the means for retaining the insulating shell in position.

In the accompanying drawings the letter $a$ denotes a coffee, tea or like pot having a handle $b$, and spout $c$, of any ordinary form and construction. The numeral 5 denotes an insulating shell located within the pot near the bottom. A heating chamber 6 is formed at the center of this shell, and passages 7 extend from the heating chamber to the periphery of the shell. The shell is fitted just loosely enough within the pot that a proper amount of liquid may flow downward from the chamber $d$ between the periphery of the shell and the inner surface of the pot to supply the heating chamber 6 through the passages 7. These passages 7 are formed preferably by indenting the metal constituting the shell.

A tube $e$ extends upward through the shell, communicating at its lower end with the heating chamber 6, and this tube supports a basket $f$ in which the coffee, or tea is placed. This tube and basket are of ordinary form and construction common to devices of this class.

The basket $f$ is supported on a sleeve 8 which fits upon the upper end of the tube $e$ and rests against a stop 9 thereon. Perforations 10 are formed through the sleeve 8, these perforations opening under a hood 11 having walls sloping downward from the center to the periphery.

The upper end of the pot has a shouldered, annular recess 12 on which the cover 13 rests. At the back of the recess 12 a lip 14 projects inward sufficiently to overlie the rim 15 of the cover.

The cover 13 is preferably composed of glass. This is dome-shaped, having an opening 21 at the highest point through which a clamp piece extends. This clamp piece has a flange 22 resting against the inner surface of the cover, and a threaded stem 16 fitting a threaded opening in the handle or knob 17. This knob contains a chamber 18 through the wall of which openings 19 are formed. A washer 20 of rubber or like yielding material is located between the flange and the under surface of the cover. By this construction a passage is formed from within the cover to the outer surface thereof, through which pressure from within the pot is relieved.

A flange 24 extends about the inner periphery of the pot and outward therefrom nearly to the outer edge of the insulating shell 5. This flange has depthwise openings 25, preferably located at diametrically opposite sides, and lips 26 projecting from the outer surface of the insulating shell near the top are formed to pass through these openings. By locating the lips in position to pass through the openings the shell may be inserted in place, and then by turning the shell to the position shown in Fig. 1 it is locked securely in position. The flange 24 affords additional means for insulating the chamber $d$ from such excessive heat as to cause the contents therein to boil, and the openings 25 provide means through which the liquid contents of the chamber $d$ may pass to the chamber 6.

It is essential that the liquid contents of the chamber $d$ be kept below the boiling point, for if it shall reach a higher degree of temperature it is necessary to provide vent openings from the chamber $d$ to relieve the pressure caused by the higher temperature of the liquid, and this allows the aroma of the coffee to escape. In constructing a device as herein described the liquid contents of the chamber $d$ are effectually kept below the boiling point.

In the operation of the device the insulating shell 5 prevents the liquid within the chamber $d$ from reaching the boiling point. The comparatively shallow passages 7, however, extending from the periphery of the shell to the heating chamber 6 conducts a thin volume of the liquid to the heating chamber, and the flame coming in contact with the outer surface of the pot directly underneath the passages 7 quickly heats this thin volume of liquid so that by the time it reaches the chamber 6 it is practically at the boiling point. This enables the liquid to quickly reach the boiling point within the chamber 6 from which it is forced by pressure upward through the tube $e$ in the usual manner, where it is ejected through the openings 10 underneath the hood 11 which directs the liquid downward into the coffee or like material located in the basket $f$.

In the form of the device shown in Fig. 3, the pot has a depressed portion 30 common to tea pots, and the passages 31 in this form of the structure are made by indenting the side walls of the insulating shell 32, as plainly shown in Fig. 4 of the drawings. In this form of the structure the thin volume of liquid passing down through the passages 31 is heated to a considerable degree before it reaches the heating chamber 32, the quantity of liquid in contact with that part of the bottom of the pot between the insulating shell 33 and the inner wall of the pot being so thin as to prevent the liquid within the chamber 34 from becoming heated to the boiling point. In fact, a blaze sufficient to extend up the inclined sides of the depressed portion 30 will be sufficient to quickly heat the liquid in the heating chamber 32 to the proper degree.

While I have shown and described herein passages for liquid formed in the insulating shell, yet it is obvious that these passages may be otherwise formed by stamping out a portion of the structure other than that forming the shell.

What I claim as my invention and desire to secure by Letters Patent, is:—

1. A receptacle, an insulating shell located in the bottom of the receptacle and forming a heating chamber at the center of the shell, passages partially formed by the walls of the shell and extending along the surface thereof from the periphery to said heating chamber, a tube extending upward from said chamber, and a basket supported on said tube.

2. A receptacle, an insulating shell located at the bottom of the receptacle and forming a chamber at the center of said shell, passages partially formed by indentations extending along the surface of the walls of said shell to said chamber, a tube extending from said chamber upward, and a basket supported by said tube.

3. A receptacle, an insulating shell located at the bottom of the receptacle and forming a heating chamber at the center of the shell, shallow passages formed partially by the walls of the shell and partially by said receptacle and extending along the surface of the walls to said heating chamber, a tube extending upward from said chamber, and a basket supported on said tube.

4. A receptacle, an insulating shell located in the bottom of the receptacle and forming a heating chamber at the center of said shell, passages partially formed by the walls of said shell and extending radially along the surface of the wall into said heating chamber, a tube extending upward from said chamber, and a basket supported on said tube.

5. A receptacle, an insulating shell located in the bottom of the receptacle and forming a heating chamber at the center thereof, passages partially formed by said shell and extending along the surface of the bottom wall of the shell to said heating chamber, a tube extending upward from said heating chamber, a sleeve telescoped on the upper end of the tube, a basket supported by said sleeve, a mush-room shaped hood at the end of the sleeve, and perforations through the wall of the sleeve underneath said hood.

6. A cover for a receptacle for heating purposes composed of glass of dome-shape with a central opening, a clamp having a flange located within the cover and a hollow threaded stem projecting through said opening, and a handle fitting said threaded stem and having a chamber with openings therefrom to the outer surface of the handle.

7. A cover for a receptacle for heating purposes composed of glass of dome-shape with a central opening, a clamp having a flange located within the cover and a hollow threaded stem projecting through said opening, a washer of flexible material located between said flange and the inner surface of the cover, and a handle fitting said threaded stem and having a chamber with openings extending from said chamber to the outer surface of the handle.

8. A receptacle, a flange projecting from the inner surface of the receptacle, an insulating shell located at the bottom of the receptacle and held in place by said flange, said shell having a heating chamber in its under surface, passages extending from the periphery of said shell to the heating chamber, a tube extending upward from said chamber, and a basket supported on said tube.

9. A receptacle, a flange projecting from the inner surface of the receptacle and provided with openings, an insulating shell arranged to underlie the flange and having lips to pass through said openings, said shell having a heating chamber in its under surface, passages extending from the periphery of said shell to the heating chamber, a tube extending from said chamber, and a basket supported on said tube.

JOHN GAUNT.

Witnesses:
T. HENRY PRISK,
EDWIN S. MAY.